US008807392B2

(12) United States Patent
Smeller et al.

(10) Patent No.: US 8,807,392 B2
(45) Date of Patent: Aug. 19, 2014

(54) METHOD AND APPARATUS FOR DISPENSING A BEVERAGE FROM A LIQUID CONCENTRATE

(75) Inventors: Donald W. Smeller, Converse, TX (US); Jarrell L. Jennings, III, Schertz, TX (US); Robert L. Robinson, Universal City, TX (US); Merrill R. Good, San Antonio, TX (US); George E. Hernandez, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 99 days.

(21) Appl. No.: 13/317,488

(22) Filed: Oct. 19, 2011

(65) Prior Publication Data

US 2012/0111887 A1    May 10, 2012

Related U.S. Application Data

(60) Provisional application No. 61/456,696, filed on Nov. 10, 2010.

(51) Int. Cl.
| | |
|---|---|
| B67D 7/74 | (2010.01) |
| B67D 7/78 | (2010.01) |
| B67D 7/06 | (2010.01) |
| B67D 1/08 | (2006.01) |
| B05B 7/30 | (2006.01) |
| B05B 7/12 | (2006.01) |
| B05B 7/06 | (2006.01) |
| F23D 11/16 | (2006.01) |
| A47J 31/40 | (2006.01) |
| B67D 1/00 | (2006.01) |
| B01F 15/00 | (2006.01) |

(52) U.S. Cl.
CPC ............ B67D 1/0036 (2013.01); A47J 31/402 (2013.01); B67D 1/0044 (2013.01)
USPC ..................... 222/129.1; 222/132; 222/144.5; 222/145.1; 222/145.2; 222/148; 239/353; 239/407; 239/416.5; 239/419; 239/422; 239/428; 239/430; 366/138

(58) Field of Classification Search
USPC ................. 222/129.1, 145.5, 145.6, 1, 129.3, 222/129.4, 129, 132, 144.5, 145.1, 145.2, 222/148; 239/353, 407, 416.5, 419, 422, 239/428, 429, 430; 366/138
See application file for complete search history.

(56) References Cited

U.S. PATENT DOCUMENTS

| | | | |
|---|---|---|---|
| 3,979,023 A * | 9/1976 | Hartley | ............................ 222/61 |
| 4,676,401 A | 6/1987 | Fox et al. | |
| 4,747,692 A | 5/1988 | Harrison | |

(Continued)

FOREIGN PATENT DOCUMENTS

EP    222596 A2 *    5/1987    ............... B67D 1/00

*Primary Examiner* — Kevin P Shaver
*Assistant Examiner* — Nicholas J Weiss
(74) *Attorney, Agent, or Firm* — Christopher L. Makay

(57) ABSTRACT

A nozzle system for use with a multi-flavor beverage dispenser includes a mixing chamber having a fluid outlet therefrom; a diluent injector configured to deliver a mixing fluid from without to within the mixing chamber; and a number of concentrate injectors configured to independently deliver a fluid concentrate from without to within the mixing chamber. The concentrate injector each have associated therewith a self-sealing dispensing valve configured to substantially limit fluid flow through its respective concentrate injector to from without the mixing chamber to within the mixing chamber.

1 Claim, 9 Drawing Sheets

(56) References Cited

U.S. PATENT DOCUMENTS

| | | | |
|---|---|---|---|
| 4,753,370 A * | 6/1988 | Rudick | 222/105 |
| 5,433,349 A | 7/1995 | Romanyszyn, Jr. | |
| 5,439,143 A * | 8/1995 | Brown et al. | 222/185.1 |
| 5,575,405 A | 11/1996 | Stratton et al. | |
| 6,059,145 A | 5/2000 | Stratton et al. | |
| 6,173,862 B1 * | 1/2001 | Buca et al. | 222/1 |
| 6,253,963 B1 * | 7/2001 | Tachibana | 222/129.1 |
| 6,446,659 B2 | 9/2002 | Schroeder | |
| 6,554,165 B2 * | 4/2003 | Cote | 222/129.1 |
| 6,689,410 B2 | 2/2004 | Gerber | |
| 6,769,627 B2 | 8/2004 | Carhuff et al. | |
| 6,889,603 B2 | 5/2005 | Carhuff et al. | |
| 7,059,761 B2 | 6/2006 | Gerber | |
| 7,121,287 B2 | 10/2006 | Carhuff et al. | |
| 7,311,226 B2 * | 12/2007 | Kado et al. | 222/145.6 |
| 7,325,485 B2 | 2/2008 | Carhuff et al. | |
| 7,347,345 B2 | 3/2008 | Guerrero et al. | |
| 7,401,613 B2 | 7/2008 | Carhuff et al. | |
| 7,445,133 B2 | 11/2008 | Ludovissie et al. | |
| 7,562,793 B2 | 7/2009 | Ufheil et al. | |
| 7,564,370 B2 | 7/2009 | Hart et al. | |
| 7,694,850 B2 | 4/2010 | Guerrero et al. | |
| 7,708,838 B2 | 5/2010 | Carhuff et al. | |
| 2005/0098575 A1 | 5/2005 | Carhuff et al. | |
| 2005/0258186 A1 | 11/2005 | Hart et al. | |
| 2006/0175351 A1 | 8/2006 | Reddy et al. | |
| 2007/0267441 A1 | 11/2007 | Van Opstal et al. | |
| 2008/0206429 A1 | 8/2008 | Guerrero et al. | |
| 2009/0230149 A1 | 9/2009 | Smeller et al. | |
| 2009/0235826 A1 | 9/2009 | Hart et al. | |

\* cited by examiner

METHOD AND APPARATUS FOR DISPENSING A BEVERAGE FROM A LIQUID CONCENTRATE

RELATED APPLICATION

This present application claims, under 35 U.S.C. §119(e), all available benefit of U.S. provisional patent application Ser. No. 61/456,696 filed Nov. 10, 2010. By this reference, the full disclosure, including the drawings, of U.S. provisional patent application Ser. No. 61/456,696 is incorporated herein as though now set forth in its entirety.

BACKGROUND OF THE INVENTION

1. Field of the Invention

The present invention relates to beverage dispensers and, more particularly, but not by way of limitation, to a method and apparatus for dispensing a beverage from a liquid concentrate that is self-contained and includes a multi-flavor capability and a self-cleaning feature.

2. Description of the Related Art

Popular beverages include coffee, cappuccino, and hot chocolate, all of which are enjoyed with flavor additions. Traditional brewing methods often are less than satisfactory and the trend in the beverage service industry is to produce such beverages from a concentrate and a mixing fluid combined within and dispensed from a beverage dispenser. A typical beverage dispenser includes a whipper coupled with a concentrate supply and a mixing fluid supply, such as water, and an outlet. The number of whippers and outlets provided in a beverage dispenser corresponds to the number of beverages desired for dispensing. In operation, a concentrate and mixing fluid are delivered to a whipper which combines the concentrate and mixing fluid to form a desired beverage prior to the beverage being dispensed from a corresponding outlet. The typical beverage dispenser uses either a powdered or a liquid concentrate with liquid concentrate being preferable as powdered concentrate tends to coat surfaces within the beverage dispenser resulting in unsanitary conditions.

While the typical beverage dispenser operates satisfactorily in dispensing a desired beverage, these beverage dispensers do suffer disadvantages. Space within any beverage service industry establishment is limited. Consequently, any beverage dispenser must remain within an acceptable size. Unfortunately, this constraint restricts the number of dispensable beverages as each whipper and outlet increases the size of the beverage dispenser, resulting in a situation where the number and type of beverages is less than desirable. Moreover, each additional whipper and outlet increases the cost of the beverage dispenser. In addition, sanitation of any beverage dispenser is problematic and must be performed on a regular basis. However, cleaning a whipper and whipper chamber often results in cleaning solution being delivering into the concentrate or mixing fluid supply stream, thus causing loss of concentrate and mixing fluid. Additionally, many beverage dispensers are generally wasteful of the mixing fluid during cleaning operations and/or as a result of arbitrarily instigating cleaning operations. Because the mixing fluid often comprises water of higher quality than typically available at the tap, such spoliation of the mixing fluid is a costly disadvantage of such dispensers.

Accordingly, a beverage dispenser including a multi-flavor capability that increases beverage choice while decreasing costs and a self-cleaning feature that prevents concentrate or mixing fluid spoliation will provide an improvement over existing beverage dispensers.

It is therefore an object of the present invention to provide a beverage dispenser that includes a multi-flavor capability that increases beverage choice while decreasing costs.

It is another object of the present invention to provide a beverage dispenser that includes a self-cleaning feature that minimizes concentrate and mixing fluid spoliation.

Still other objects, features, and advantages of the present invention will become evident to those of ordinary skill in the art in light of the following.

SUMMARY OF THE INVENTION

In accordance with the present invention, a nozzle system for use with a multi-flavor beverage dispenser generally comprises a mixing chamber, said mixing chamber having a fluid outlet therefrom; a diluent injector, said diluent injector being adapted to deliver a mixing fluid from without to within said mixing chamber; and a plurality of concentrate injectors, each said concentrate injector being adapted to independently deliver a fluid concentrate from without to within said mixing chamber, wherein each said concentrate injector comprises a self-sealing dispensing valve, each said dispensing valve being adapted to substantially limit fluid flow through its respective concentrate injector to flow from without said mixing chamber to within said mixing chamber.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps. While the preferred embodiment has been described, the details may be changed without departing from the invention, which is defined by the claims.

Figure 1:
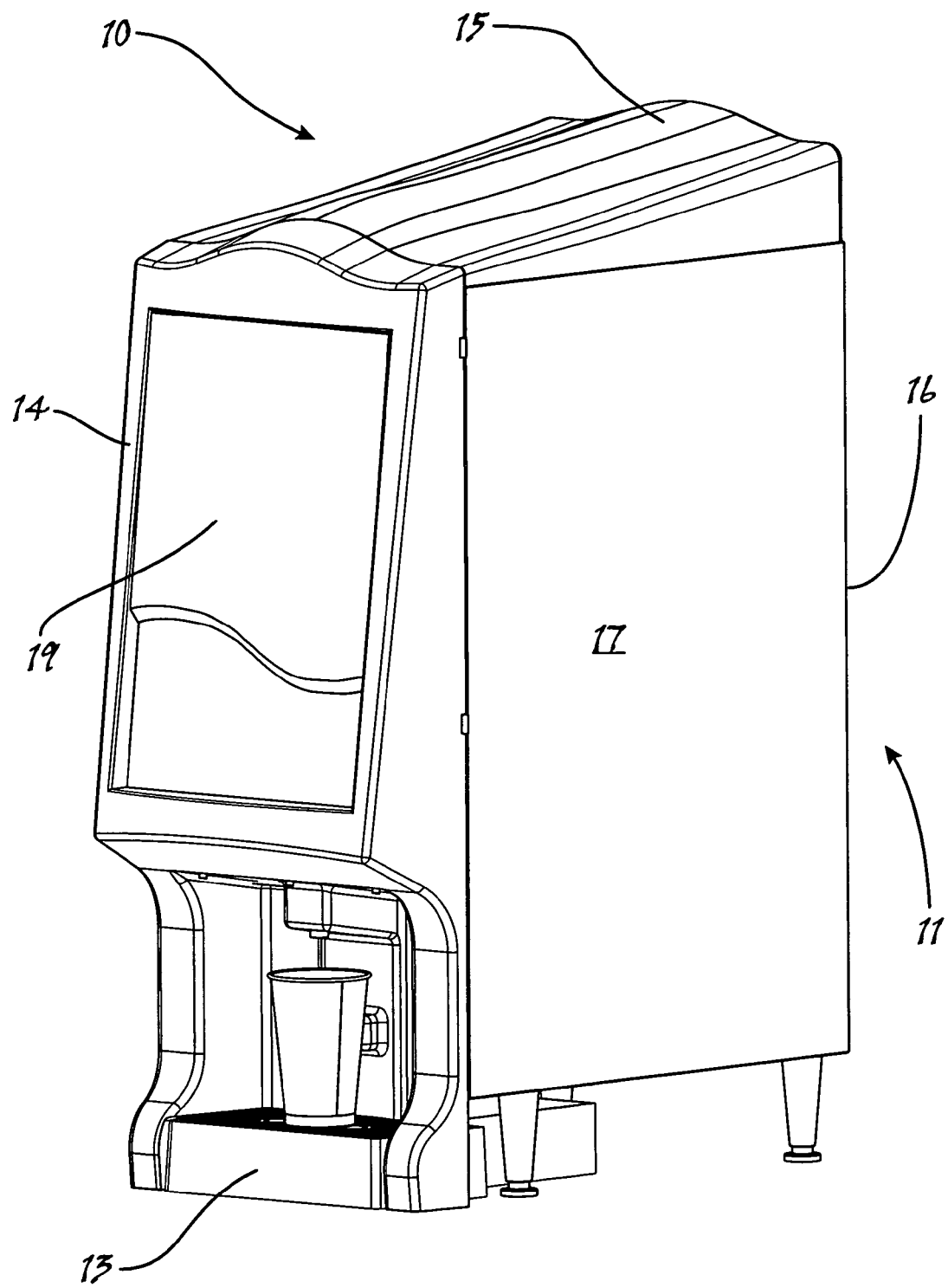
FIG. 1 is a perspective view illustrating a beverage dispenser according to the preferred embodiment.
Figure 2:
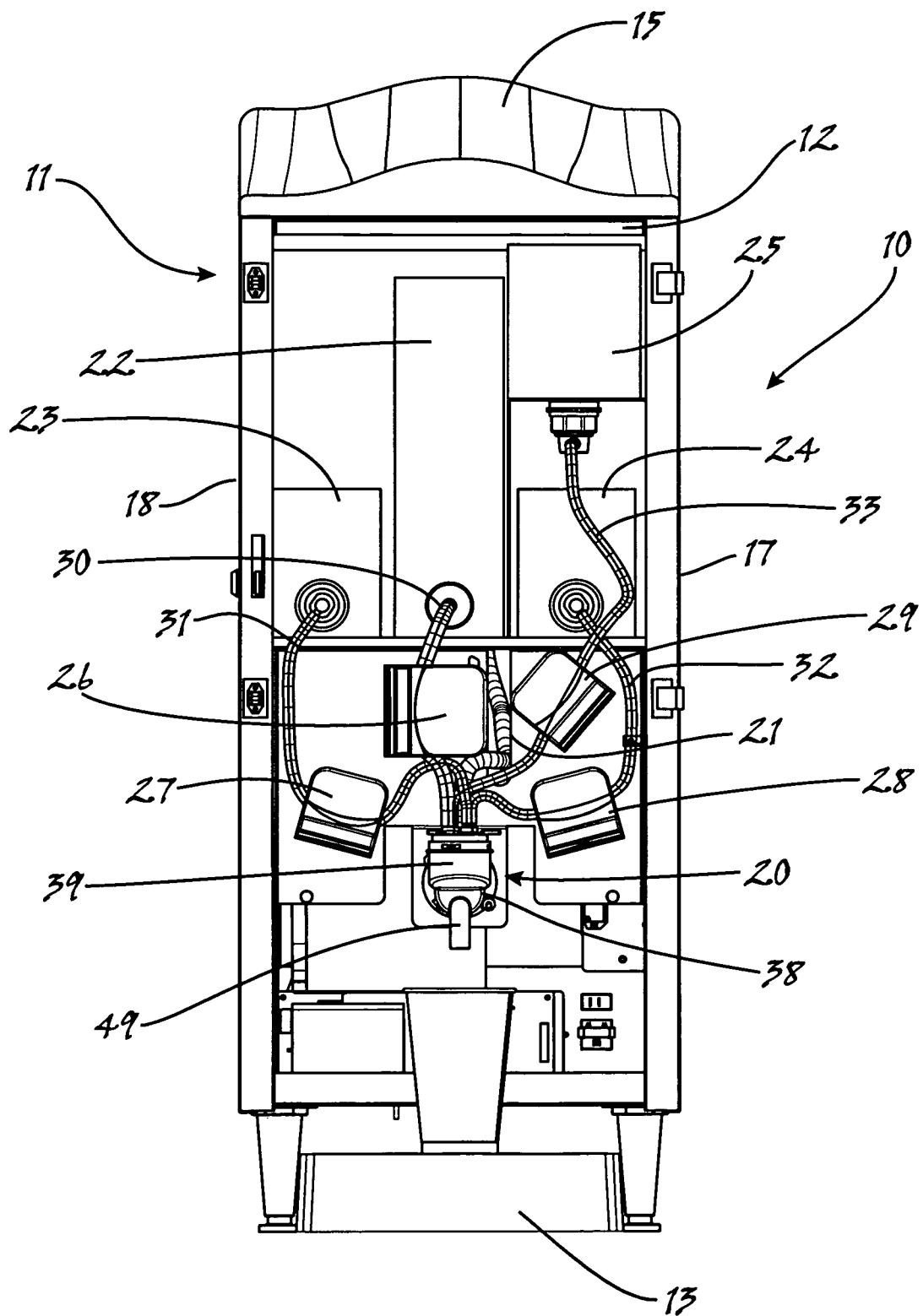
FIG. 2 is a front view illustrating components contained within a housing of the beverage dispenser according to the preferred embodiment.

FIGS. 1 and 2 illustrate a beverage dispenser 10 that combines a liquid beverage concentrate with a mixing fluid to produce a dispensed beverage. In this preferred embodiment, example liquid beverage concentrates include but are not limited to coffee, cappuccino, and hot chocolate, while the example mixing fluid includes water. It should be understood however that the beverage dispenser 10 includes a capability of introducing beverage flavoring concentrates, such as milk for coffee, cinnamon, vanilla, and the like, into the dispensed beverage. Furthermore, while the beverage dispenser 10 according to the preferred embodiment combines a liquid beverage concentrate with a mixing fluid, those of ordinary skill in the art will recognize that the beverage dispenser 10 may dispense a final product such as water with flavorings, such as lemon, cherry, strawberry, and the like.

The beverage dispenser 10 includes a housing 11 having a frame 12 that supports a drip tray 13 and removable front, top, rear and side panels 14, 15, 16, 17, and 18. The front panel 14 includes a user input 19 consisting of user input devices, such as mechanical switches, RF technology switches, or capacitive switches, well known to those of ordinary skill in the art.

Interior to the housing 11 and supported by the frame 12, the beverage dispenser 10 includes a multi-flavor nozzle system 20 that combines a liquid beverage concentrate with a mixing fluid and a beverage flavoring concentrate if desired. By way of example, the mixing fluid may be water delivered from a municipal water source to the beverage dispenser 10 and from within the housing 11 to the multi-flavor nozzle system 20 via a line 21. The beverage dispenser 10 may include within the housing 11 a hot water heater of a type well known to those of ordinary skill in the art that delivers hot water to the multi-flavor nozzle system 20 via the line 21.

In the example set forth in the preferred embodiment, the multi-flavor nozzle system 20 includes a four concentrate dispense capability. As such, the frame 11 includes space for supporting concentrate packages 22-25. The frame 11 further supports pumps 26-29, which in the preferred embodiment are peristaltic pumps well known to those of ordinary skill in the art. A line 30 wound through the pump 26 connects the concentrate package 22 with the multi-flavor nozzle system 20. A line 31 wound through the pump 27 connects the concentrate package 23 with the multi-flavor nozzle system 20. A line 32 wound through the pump 28 connects the concentrate package 24 with the multi-flavor nozzle system 20. A line 33 wound through the pump 29 connects the concentrate package 25 with the multi-flavor nozzle system 20. Example concentrates for the beverage dispenser 10 include but are not limited to milk concentrate in concentrate package 22, chocolate concentrate in concentrate package 23, vanilla concentrate in concentrate package 24, and coffee concentrate in concentrate package 25. The beverage dispenser 10 accordingly could dispense coffee with or without milk and/or vanilla and hot chocolate with or without vanilla. While the beverage dispenser 10 according to the preferred embodiment has been described with a four concentrate dispense capability, those of ordinary skill in the art will recognize that the multi-flavor nozzle system 20 may include more or less capability or the beverage dispenser 10 may include more multi-flavor nozzle systems 20.

In any case, the multi-flavor nozzle system 20 of the example set forth in the preferred embodiment includes a preferably integrally formed nozzle body 38 comprising an injector housing 39, a mixing chamber 44 and a nozzle outlet 49. As particularly shown in FIGS. 3 and 4, the mixing chamber 44 of the preferred embodiment has provided therein a whipper 45 having a plurality of whipper blades 46, each whipper blade 46 being preferably innovatively provided with holes for enhancing the froth and/or foam of the resultant beverage. The whipper 45 is dependently supported by a shaft 48 which is selectively rotatable by a provided whipper motor 47 such as is otherwise well known to those of ordinary skill in the art. While the particular size, shape and configuration of the mixing chamber 44 may generally vary widely from the depicted example according to the requirements of any particular implementation, it is noted that the fluid flow path through the mixing chamber 44 should in all implementations enable or otherwise facilitate the gravity flow of fluid from within the mixing chamber 44 through the nozzle outlet 49 to without the mixing chamber 44.

Additionally, the multi-flavor nozzle system 20 of the example set forth in the preferred embodiment includes an injector body 40 sized and shaped to be received within the injector housing 39 of the nozzle body 38. In order to ensure sealing conformance within the injector housing 39, the injector body 40 is preferably provided with one or more circumferentially disposed grooves 36 into each of which is provided an O-ring 37. As will be better understood further herein, the injector body 40 comprises a plurality of injector ports 41 formed therein for dependently receiving and supporting at least one diluent injector 50 and a plurality of concentrate injectors 58-61, each said injector being described in greater detail further herein. In any case, the injector port 41 associated with the diluent injector 50 is formed as an orifice leading from the top of the injector body 40 downward and into an annular diluent manifold 42 formed circumferentially about the lower portion of the injector body 40, which annular diluent manifold 42 further comprises a plurality of diluent injection ports 43 downwardly disposed thereabout. As will be readily apparent to those of ordinary skill in the art, the described arrangement is adapted to deliver a mixing fluid from the diluent injector 50 to the mixing chamber 44, the mixing fluid thereby delivered being substantially evenly distributed about the outer, lower portions of the injector housing 39.

As previously mentioned, the multi-flavor nozzle system 20 includes at least one diluent injector 50 and a plurality of concentrate injectors 58-61. As particularly shown in FIGS. 3 and 4, the diluent injector 50 comprises an inlet port 52 at a first, preferably barbed end 51 and an open orifice 54 at its base 53. The outer surface 55 of the diluent injector 50 is sized to fit snuggly within one of the provided injector ports 41 and, in order to ensure sealing engagement of the diluent injector 50 within the injector port 41, the outer surface 55 of the diluent injector 50 is preferably provided with one or more circumferentially disposed grooves 56 into each of which is provided an O-ring 57. Similarly, and as also particularly shown in FIGS. 3 and 4, each provided concentrate injector 58-61 comprises an inlet port 63 at its respective first, preferably barbed end 62. As will be better understood further herein, however, each concentrate injector 58-61 is in a critical aspect of the present invention provided at its respective base 64 with a self-sealing dispensing valve 72, each of which, as also will be better understood further herein, is adapted to substantially limit fluid through its respective concentrate injector 58-61 to flow from without the mixing chamber 44 to within the mixing chamber 44. In any case, as with the diluent injector 50, each concentrate injector 58-61 is sized to fit snuggly within one of the provided injector ports 41 and, in order to ensure sealing engagement of each concentrate injector 58-61 within its respective injector port 41, the outer surface 67 of each concentrate injector 58-61 is preferably provided with one or more circumferentially disposed grooves 68 into each of which is provided an O-ring 69.

Figure 3:
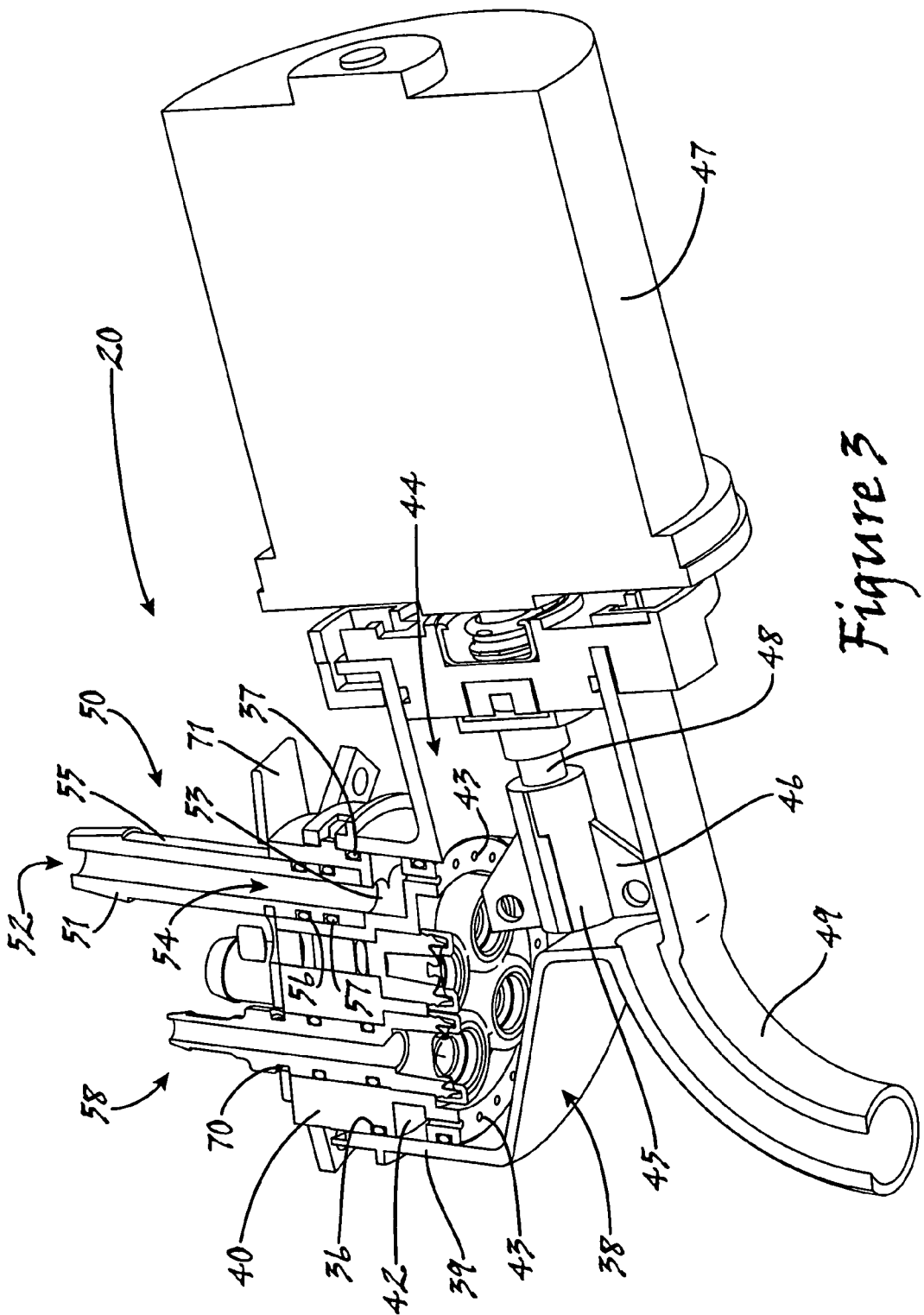
FIG. 3 is a perspective view in cross-section illustrating a multi-flavor nozzle and whipper of the beverage dispenser according to the preferred embodiment.
Figure 4:
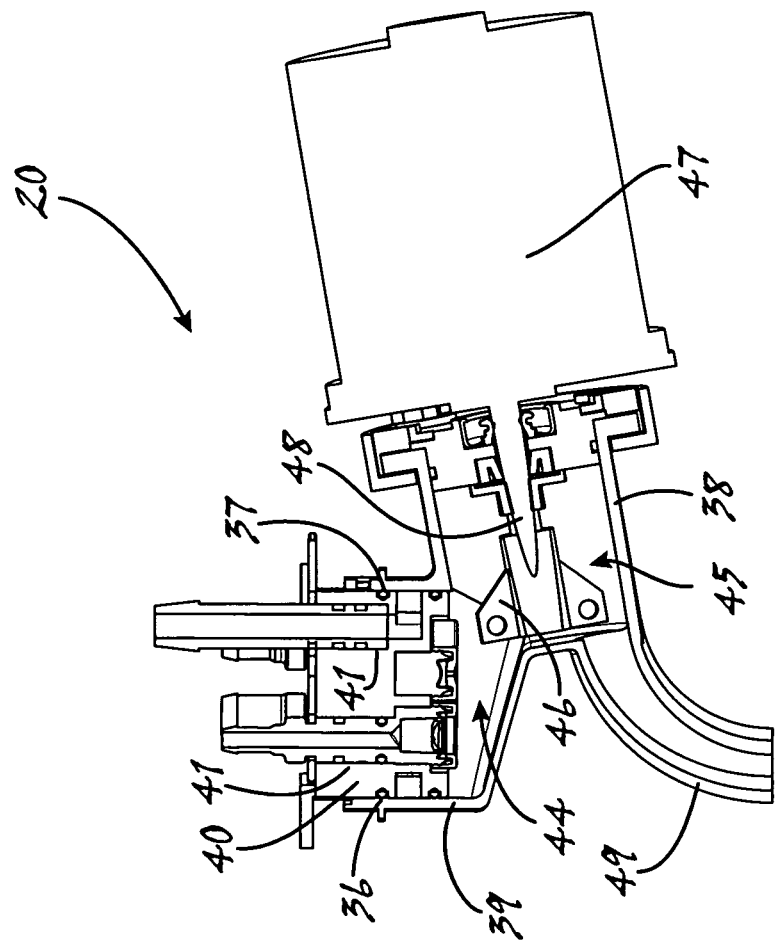
FIG. 4 is a side view in cross-section illustrating the multi-flavor nozzle and the whipper of the beverage dispenser according to the preferred embodiment.

Finally, as particularly shown in FIG. 3, each of the injectors 50, 58-61 may additionally be provided with an uppermost circumferential groove 70 such that the injectors 50, 58-61 may be, from their first ends 51, 58 secured in place within the injector body 40 by a provided injector retaining clip 71 or the like. In any case, with the injectors 50, 58-61 in place within the injector body 40, fluid communication may be established between the various provided concentrate packages 22-25 and a respective concentrate injector 58-61 as well as between the source of mixing fluid and the diluent injector 50. In particular, mixing fluid communication is established by connecting the free end of the mixing fluid inlet line 21 to the first end 51 of the diluent injector 50 about its inlet port 52. Likewise fluid communication is established between the first concentrate package 22 and the first concentrate injector 58 by connecting the free end of the first concentrate inlet line 30 to the first end 62 of the first concentrate injector 58 about its inlet port 63; fluid communication is established between the second concentrate package 23 and the second concentrate injector 59 by connecting the free end of the second concentrate inlet line 31 to the first end 62 of the second concentrate injector 59 about its inlet port 63; fluid communication is established between the third concentrate package 24 and the third concentrate injector 60 by connecting the free end of the third concentrate inlet line 32 to the first end 62 of the third concentrate injector 60 about its inlet port 63; and fluid communication is established between the fourth concentrate package 25 and the fourth concentrate injector 61 by connecting the free end of the fourth concentrate inlet line 33 to the first end 62 of the fourth concentrate injector 61 about its inlet port 63.

Figure 5:
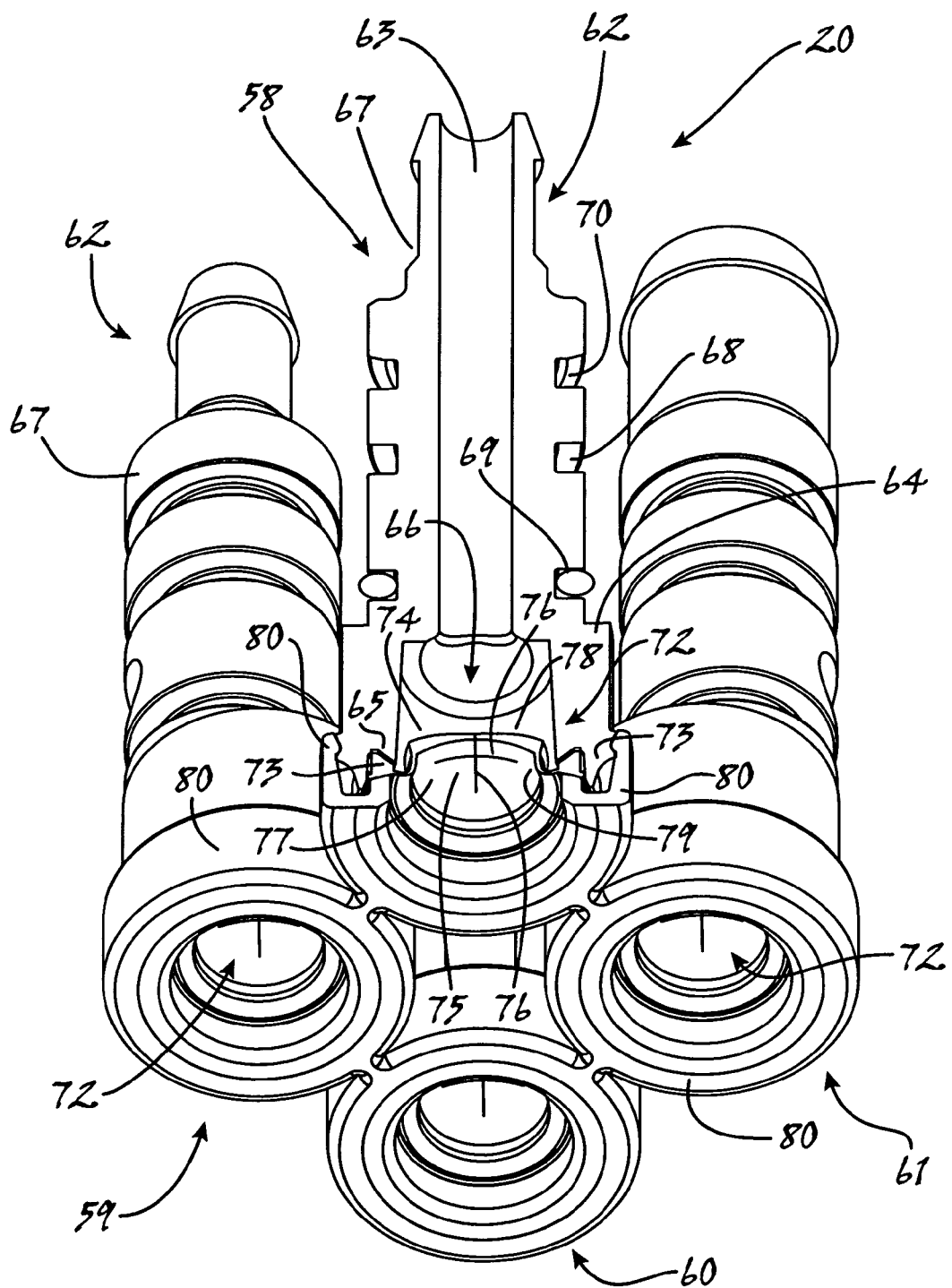
FIG. 5 is a perspective view in partial cross-section illustrating injectors for the multi-flavor nozzle of the beverage dispenser according to the preferred embodiment.

As also previously mentioned, a critical aspect of the present invention comprises the provision of a self-sealing dispensing valve 72 at the respective base end 64 of each concentrate injector 58-61. In the preferred embodiment of the present invention, each self-sealing dispensing valve 72 is implemented substantially as described in U.S. Pat. No. 5,439,143 issued Aug. 8, 1995 to Brown et al. ("Brown '143"), which, by this reference, is incorporated herein as though now set forth in its entirety. In particular, as shown in FIG. 5 for the first one of the concentrate injectors 58 (each other injector 59-61 being provided with substantially identical structure), the self-sealing dispensing valve includes a marginal flange 73, a valve head 74 with a discharge orifice 75 therein, and a connector sleeve 79 having one end connected with the valve flange 73 and the opposite end connected with the valve head 74 adjacent a marginal edge thereof. As described in Brown '143, the discharge orifice is formed with a plurality of slits 76 or the like and the interior surface 77 and exterior surface 78 are arcuately formed to cause the valve 72 to snap open under pressure from within the interior 66 of the concentrate injector 58 and to snap closed in the absence of such pressure. In order to secure the dispensing valve 72 in place at the base 64 of the concentrate injector 58, an annular groove 65 is formed about the base 64 of the concentrate injector 58 with size and shape generally corresponding to the marginal flange 73 of the valve 72. A multi-ring valve retaining clip 80 is then snap fit into engagement with the base 64 of the first concentrate injector 58 (as well as the remaining concentrate injectors 59-61) to clampingly hold the valve 72 in operable position.

As described in detail in Brown '143, the connector sleeve 79 has a resiliently flexible construction, such that when pressure within the interior space 66 of the concentrate injector 58 raises above a predetermined amount, the valve head 74 shifts outwardly in a manner which causes the connector sleeve 79 to double over and extend rollingly, causing the discharge orifice 75 to open to allow fluid flow from within the interior space 66 of the concentrate injector 58 to the mixing chamber 44. Additionally, however, the connector sleeve 79 is constructed to provide sufficient resiliency to automatically snap the valve head 74 back to the fully retracted position upon reduction of the pressure within the interior space 66 of the concentrate injector 58 to below the predetermined amount, no suck back or negative pressure from the concentrate injector 58 being required to effect closure of the valve 72.

Implemented as herein described, the multi-flavor nozzle system 20 of the present invention enables the mixing chamber 44 to be cleansed as often as between every dispense cycle because the provided self-sealing dispensing valves 72 prevent contamination and/or dilution by the cleansing fluid of the concentrate sources. In particular, the present invention contemplates running a cleaning cycle (which may simply comprise dispensing hot water from the diluent injector 50 through the mixing chamber 44 under the agitation of the whipper 45): (a) whenever manually instigated; (b) automatically upon the passage of a predetermined length of time or according to a set schedule; (c) prior to dispensing a selected beverage combination deemed incompatible flavor-wise with a previously dispensed beverage combination; (d) upon any combination of the foregoing events; or (e) upon the occurrence of any other predetermined triggering event.

In one example illustrative of the manner of use of the multi-flavor nozzle system 20 of the present invention, the first concentrate package 22 is taken for illustrative purposes to contain milk, the second concentrate package 23 is taken for illustrative purposes to contain chocolate, the third concentrate package 24 is taken for illustrative purposes to contain vanilla flavoring and the fourth concentrate package 25 is taken for illustrative purposes to contain coffee while the mixing fluid is assumed for illustrative purposes to be water. Additionally, for illustrative purposes, it is assumed that the users of the beverage dispenser 10 incorporating the multi-flavor nozzle system 20 of the present invention demand the following beverages in the order set forth: coffee; coffee with milk; nothing for an extended period of time; coffee with milk; coffee with vanilla flavoring; and then hot chocolate.

To begin, then, the controller of the beverage dispenser 10 operates to dispense the first demanded coffee by first enabling flow of water at a normal flow rate, which in this case of course would be otherwise conventionally heated, through the mixing fluid inlet line 21 and into the inlet port 52 at the first end 51 of the diluent injector 50. As will be appreciated by those of ordinary skill in the art, especially in light of the foregoing discussion, the heated water will then flow freely through the open orifice 54 at the base end 53 of the diluent injector 50 and into and throughout the diluent manifold 42, whereafter the heated water will begin to spray through the provided diluent injector ports 43 into and substantially evenly distributed about the outer, lower portions of the mixing chamber 44.

As the heated water begins to be sprayed into the mixing chamber 44, the fourth pump 29 operates to force the coffee product from the fourth concentrate package 25 through the fourth concentrate line 33 into the inlet port 63 at the first end 62 of the fourth concentrate injector 61. As the pressure of the coffee product builds within the interior 66 of the fourth concentrate injector 61, the self-sealing dispensing valve 72 provided at the base end 64 of the fourth concentrate injector 61 is snapped open, as previously described, thereby enabling flow of the coffee product through the valve 72 and into the mixing chamber 44 where the coffee product joins the flowing heated water, which together flow into contact with the blades 46 of the whipper 45, which are operated under the control of the beverage dispenser controller by the whipper motor 47. The thoroughly mixed coffee beverage then flows freely through the nozzle outlet 49 into a cup or other beverage receptacle for enjoyment of a user.

As the quantity of coffee beverage produced reaches the quantity required for the particular cup or other beverage receptacle, the fourth pump 29 is deactivated by the beverage dispenser controller, thereby causing a decrease in the pressure of the coffee product within the interior 66 of the fourth concentrate injector 61. As soon as the pressure within the interior 66 of the fourth concentrate injector 61 decreases to below a threshold value, as previously described, the self-sealing dispensing valve 72 provided at the base end 64 of the fourth concentrate injector 61 is snapped closed, as also previously described. With the flow of coffee product into the mixing chamber 44 thus terminated, the flow of heated water through the mixing fluid inlet line 21 is also terminated under the otherwise ordinary control of the beverage dispenser controller, completing the desired dispensation of the coffee beverage.

Continuing with the example, it is noted that the next beverage assumed demanded is coffee with milk, which is further assumed to be demanded without significant delay following the previously demanded beverage. Because the currently demanded coffee with milk beverage contains each flavoring component present in the previously demanded coffee beverage, which did not contain any ingredients dictating special handling, and is demanded within a reasonable time following the prior dispensation, it may be assumed that the currently demanded beverage may be dispensed without need for running a cleaning cycle. As a result, the currently demanded coffee with milk beverage is dispensed as follows.

As with the previously dispensed coffee beverage, the controller of the beverage dispenser 10 first operates to enable flow of water at a normal flow rate, which in this case like the prior case would be otherwise conventionally heated, through the mixing fluid inlet line 21 and into the inlet port 52 at the first end 51 of the diluent injector 50. The heated water then flows freely through the open orifice 54 at the base end 53 of the diluent injector 50 and into and throughout the diluent manifold 42, whereafter the heated water sprays through the provided diluent injector ports 43 into and substantially evenly distributed about the outer, lower portions of the mixing chamber 44.

As the heated water begins to spray into the mixing chamber 44, the fourth pump 29 operates to force the coffee product from the fourth concentrate package 25 through the fourth concentrate line 33 into the inlet port 63 at the first end 62 of the fourth concentrate injector 61. As the pressure of the coffee product builds within the interior 66 of the fourth concentrate injector 61, the self-sealing dispensing valve 72 provided at the base end 64 of the fourth concentrate injector 61 is snapped open, as previously described, thereby enabling flow of the coffee product through the valve 72 and into the mixing chamber 44 where the coffee product joins the flowing heated water.

Substantially simultaneously with the introduction to the heated water of the coffee product, the first pump 26 operates to force the milk product from the first concentrate package 22 through the first concentrate line 30 into the inlet port 63 at the first end 62 of the first concentrate injector 58. As the pressure of the milk product builds within the interior 66 of the first concentrate injector 58, the self-sealing dispensing valve 72 provided at the base end 64 of the first concentrate injector 58 is snapped open, as previously described, thereby enabling flow of the milk product through the valve 72 and into the mixing chamber 44 where the milk product also joins the coffee product and flowing heated water, which all three together flow into contact with the blades 46 of the whipper 45, which are operated under the control of the beverage dispenser controller by the whipper motor 47. The thoroughly mixed coffee with milk beverage then flows freely through the nozzle outlet 49 into a cup or other beverage receptacle for enjoyment of a user.

As the quantity of coffee with milk beverage produced reaches the quantity required for the particular cup or other beverage receptacle, the first pump 26 and the fourth pump 29 are each deactivated by the beverage dispenser controller, thereby causing a decrease in the pressure of the milk product within the interior 66 of the first concentrate injector 58 as well as a decrease in the pressure of the coffee product within the interior of the fourth concentrate injector 61. As soon as the pressure within the interior 66 of the first concentrate injector 58 decreases to below a threshold value, as previously described, the self-sealing dispensing valve 72 provided at the base end 64 of the first concentrate injector 58 is snapped closed, as also previously described. Likewise, as soon as the pressure within the interior 66 of the fourth concentrate injector 61 decreases to below a threshold value, the self-sealing dispensing valve 72 provided at the base end 64 of the fourth concentrate injector 61 is snapped closed. With both the flow of coffee product into the mixing chamber 44 and the flow of milk product into the mixing chamber 44 thus terminated, the flow of heated water through the mixing fluid inlet line 21 is also terminated under the otherwise ordinary control of the beverage dispenser controller, completing the desired dispensation of the coffee with milk beverage.

Continuing further with the previously established example, it is noted that the next demanded beverage is also coffee with milk, but that an extended period of time is assumed to have elapsed prior to demand of the beverage. As a result, at least one preferred implementation of the present invention contemplates that the controller for the beverage dispenser 10 will upon the passage of a predetermined time period instigate a cleaning cycle. Additionally, however, it is noted that the previously dispensed beverage contained milk, which is known to be generally more susceptible than other products to the growth of bacteria. As a result, the controller of the beverage dispenser may be implemented to shorten the threshold predetermined time period dictating instigation of a cleaning cycle when milk or a like product has been dispensed.

In any case, the cleaning cycle begins with the controller of the beverage dispenser 10 first operating to enable flow of water, conventionally heated to a very high temperature, through the mixing fluid inlet line 21 and into the inlet port 52 at the first end 51 of the diluent injector 50. The heated water then flows through the open orifice 54 at the base end 53 of the diluent injector 50 and into and throughout the diluent manifold 42, whereafter the heated water sprays through the provided diluent injector ports 43 into and all about mixing chamber 44. Although not set forth in the above example, it should be noted that a concentrate type injector may, if desired, be provided for the purpose of introducing a cleaning fluid into the flow of heated water in similar manner as previously described with respect to introduction to a product of a concentrate product.

In any case, the cleaning water or solution, which may if desired be further distributed utilizing the whipper 45, is drained through the nozzle outlet 49 and into the tray 13 where it is in turn handled in the conventional manner of a spill into the tray 13. Critically, however, it is noted no cleaning water or solution enters into any of the concentrate injectors 58-61, each of which are isolated from the mixing chamber 44 with a respectively provided self-sealing dispensing valve 72. Finally, once the mixing chamber 44 is deemed "clean" the flow of heated water through the mixing fluid inlet line 21 is terminated under the otherwise ordinary control of the beverage dispenser controller, completing the desired cleaning cycle. The nozzle system 20 of the beverage dispenser 10 thus being cleaned and ready for any further use, the desired coffee with milk beverage is dispensed when demanded as generally previously described.

As the example continues, the next desired beverage is coffee with vanilla flavoring. In this case, it is first noted that coffee with vanilla flavoring may, from a flavor perspective, be considered compatible with a previous dispensation of coffee with milk, the coffee and vanilla combination being generally overpowering in flavor to any remnant of milk as may exist within the mixing chamber 44 as a result of the previous dispensation. If desired for any reason however, be it safety or other special handling concern or otherwise, the present invention may be implemented such that a cleaning cycle is instigated prior to any dispensation of a product combination not containing any component that follows any previous dispensation that does contain the omitted component. In such a case, the user is instructed to delay placing his or her cup in order that the cleaning cycle may operate, as previously described, after which the user is instructed to place his or her cup for receiving the desired beverage. As will be appreciated by those of ordinary skill in the art, the controller for the beverage dispenser 10 may if desired be programmed to require user acknowledgement of such instructions, which of course may take place through the user inputs 19 provided on the front panel 14 of the beverage dispenser 10. In any case, following the implemented cleaning cycle, the beverage dispenser 10 operates to dispense the coffee with vanilla beverage.

To dispense the coffee with vanilla beverage, the controller of the beverage dispenser 10 first operates to enable flow of water at a normal flow rate, which in this case like the prior case would be otherwise conventionally heated, through the mixing fluid inlet line 21 and into the inlet port 52 at the first end 51 of the diluent injector 50. The heated water then flows freely through the open orifice 54 at the base end 53 of the diluent injector 50 and into and throughout the diluent manifold 42, whereafter the heated water sprays through the provided diluent injector ports 43 into and substantially evenly distributed about the outer, lower portions of the mixing chamber 44.

As the heated water begins to spray into the mixing chamber 44, the fourth pump 29 operates to force the coffee product from the fourth concentrate package 25 through the fourth concentrate line 33 into the inlet port 63 at the first end 62 of the fourth concentrate injector 61. As the pressure of the coffee product builds within the interior 66 of the fourth concentrate injector 61, the self-sealing dispensing valve 72 provided at the base end 64 of the fourth concentrate injector 61 is snapped open, as previously described, thereby enabling flow of the coffee product through the valve 72 and into the mixing chamber 44 where the coffee product joins the flowing heated water.

Substantially simultaneously with the introduction to the heated water of the coffee product, the third pump 28 operates to force the vanilla product from the third concentrate package 24 through the third concentrate line 32 into the inlet port 63 at the first end 62 of the third concentrate injector 60. As the pressure of the vanilla product builds within the interior 66 of the third concentrate injector 60, the self-sealing dispensing valve 72 provided at the base end 64 of the third concentrate injector 60 is snapped open, as previously described, thereby enabling flow of the vanilla product through the valve 72 and into the mixing chamber 44 where the vanilla product also joins the coffee product and flowing heated water, which all three together flow into contact with the blades 46 of the whipper 45, which are operated under the control of the beverage dispenser controller by the whipper motor 47. The thoroughly mixed coffee with vanilla beverage then flows freely through the nozzle outlet 49 into the cup or other beverage receptacle as placed by the user in accordance with the previously described instruction.

As the quantity of coffee with vanilla beverage produced reaches the quantity required for the particular cup or other beverage receptacle, the third pump 28 and the fourth pump 29 are each deactivated by the beverage dispenser controller, thereby causing a decrease in the pressure of the vanilla product within the interior 66 of the third concentrate injector 60 as well as a decrease in the pressure of the coffee product within the interior of the fourth concentrate injector 61. As soon as the pressure within the interior 66 of the third concentrate injector 60 decreases to below a threshold value, as previously described, the self-sealing dispensing valve 72 provided at the base end 64 of the third concentrate injector 60 is snapped closed, as also previously described. Likewise, as soon as the pressure within the interior 66 of the fourth concentrate injector 61 decreases to below a threshold value, the self-sealing dispensing valve 72 provided at the base end 64 of the fourth concentrate injector 61 is snapped closed. With both the flow of coffee product into the mixing chamber 44 and the flow of vanilla product into the mixing chamber 44 thus terminated, the flow of heated water through the mixing fluid inlet line 21 is also terminated under the otherwise ordinary control of the beverage dispenser controller, completing the desired dispensation of the coffee with vanilla beverage.

Finally, the previously established example calls for dispensing a hot chocolate beverage immediately following the dispensation of the coffee with vanilla beverage. For this example, it is assumed that the previously utilized vanilla product comprised a flavoring not requiring the special handling as previously described in application to the milk product. In this case, however, it may be determined that the powerful flavoring of the coffee with vanilla beverage is not compatible with the more subtle flavoring of the now desired hot chocolate beverage. As a consequence, the controller of the beverage dispenser 10 is therefore preferably programmed to instigate a cleaning cycle prior to dispensing the demanded hot chocolate beverage.

As in the previously described case of a cleaning cycle being instigated as a matter of special handing, in this case the user is also instructed to delay placing his or her cup in order that the cleaning cycle may operate, as previously described, after which the user is instructed to place his or her cup for receiving the desired beverage. Following the implemented cleaning cycle, the beverage dispenser 10 then operates to dispense the hot chocolate beverage. To dispense the hot chocolate beverage, the controller of the beverage dispenser 10 first operates to enable flow of water at a normal flow rate, which in this case like the prior cases would be otherwise conventionally heated, through the mixing fluid inlet line 21 and into the inlet port 52 at the first end 51 of the diluent injector 50. The heated water then flows freely through the open orifice 54 at the base end 53 of the diluent injector 50 and into and throughout the diluent manifold 42, whereafter the heated water sprays through the provided diluent injector ports 43 into and substantially evenly distributed about the outer, lower portions of the mixing chamber 44.

As the heated water begins to spray into the mixing chamber 44, the second pump 27 operates to force the chocolate product from the second concentrate package 23 through the second concentrate line 31 into the inlet port 63 at the first end 62 of the second concentrate injector 59. As the pressure of the chocolate product builds within the interior 66 of the second concentrate injector 59, the self-sealing dispensing valve 72 provided at the base end 64 of the second concentrate injector 59 is snapped open, as previously described, thereby enabling flow of the chocolate product through the valve 72 and into the mixing chamber 44 where the chocolate product joins the flowing heated water, which together flow into contact with the blades 46 of the whipper 45, which are operated under the control of the beverage dispenser controller by the whipper motor 47. The thoroughly mixed hot chocolate beverage then flows freely through the nozzle outlet 49 into the cup or other beverage receptacle as placed by the user in accordance with the previously described instruction.

As the quantity of hot chocolate beverage produced reaches the quantity required for the particular cup or other beverage receptacle, the second pump 27 is deactivated by the beverage dispenser controller, thereby causing a decrease in the pressure of the chocolate product within the interior 66 of the second concentrate injector 59. As soon as the pressure within the interior 66 of the second concentrate injector 59 decreases to below a threshold value, as previously described, the self-sealing dispensing valve 72 provided at the base end 64 of the second concentrate injector 59 is snapped closed, as also previously described. With the flow of chocolate product into the mixing chamber 44 thus terminated, the flow of heated water through the mixing fluid inlet line 21 is also terminated under the otherwise ordinary control of the beverage dispenser controller, completing the desired dispensation of the hot chocolate beverage and concluding this example.

Turning then to FIGS. 6-9, an alternatively preferred implementation of the multi-flavor nozzle system 100 of the example set forth in the preferred embodiment includes as in the previously described implementation a preferably integrally formed nozzle body 101 comprising an injector housing 102, a mixing chamber 103 and a nozzle outlet 104. Although not shown in the figures, the mixing chamber 103 of the alternately preferred implementation also has provided therein a whipper 45 having a plurality of whipper blades 46, the whipper 45 being dependently supported by a shaft 48 which is selectively rotatable by a provided whipper motor 47 such as is otherwise well known to those of ordinary skill in the art. As with the previously described implementation, it is noted that the fluid flow path through the mixing chamber 103 should in this implementation enable or otherwise facilitate the gravity flow of fluid from within the mixing chamber 103 through the nozzle outlet 104 to without the mixing chamber 103.

Additionally, the multi-flavor nozzle system 100 includes an injector body 105 sized and shaped to be received within the injector housing 102 of the nozzle body 101. In order to ensure sealing conformance within the injector housing 102, the injector body 105 is preferably provided with one or more circumferentially disposed grooves 139 into each of which is provided an O-ring 140. As will be better understood further herein, the injector body 105 comprises a plurality of injector ports 106 formed therein for dependently receiving and supporting at least one diluent injector 111 and a plurality of concentrate injectors 120-123, each said injector being described in greater detail further herein. In any case, the injector port 106 associated with the diluent injector 111 is formed as an orifice leading from the top of the injector body 105 downward and into an annular diluent manifold 107 formed circumferentially about the lower portion of the injector body 105, which annular diluent manifold 107 further comprises a plurality of diluent injection ports 108 downwardly disposed thereabout. As will be readily apparent to those of ordinary skill in the art, the described arrangement is adapted to deliver a mixing fluid from the diluent injector 111 to the mixing chamber 103, the mixing fluid thereby delivered being substantially evenly distributed about the outer, lower portions of the injector housing 102.

As previously mentioned, the multi-flavor nozzle system 100 includes at least one diluent injector 111 and a plurality of concentrate injectors 120-123. As particularly shown in FIGS. 6 and 7, the diluent injector 111 comprises an inlet port 113 at a first, preferably barbed end 112 and an open orifice 115 at its base 114. The outer surface 116 of the diluent injector 111 is sized to fit snuggly within a particular one of the provided injector ports 106 and, in order to ensure sealing engagement of the diluent injector 111 within the injector port 106, the outer surface 116 of the diluent injector 111 is preferably provided with one or more circumferentially disposed grooves 117 into each of which is provided an O-ring 118. Similarly, and as also particularly shown in FIGS. 6 and 7, each provided concentrate injector 120-123 comprises an inlet port 125 at its respective first, preferably barbed end 124. As will be better understood further herein, however, each concentrate injector 120-123 is in a critical aspect of the present invention provided at its respective base 127 with a self-sealing dispensing valve 130, each of which, as also will be better understood further herein, is adapted to substantially limit fluid through its respective concentrate injector 120-123 to flow from without the mixing chamber 103 to within the mixing chamber 103.

Figure 6:
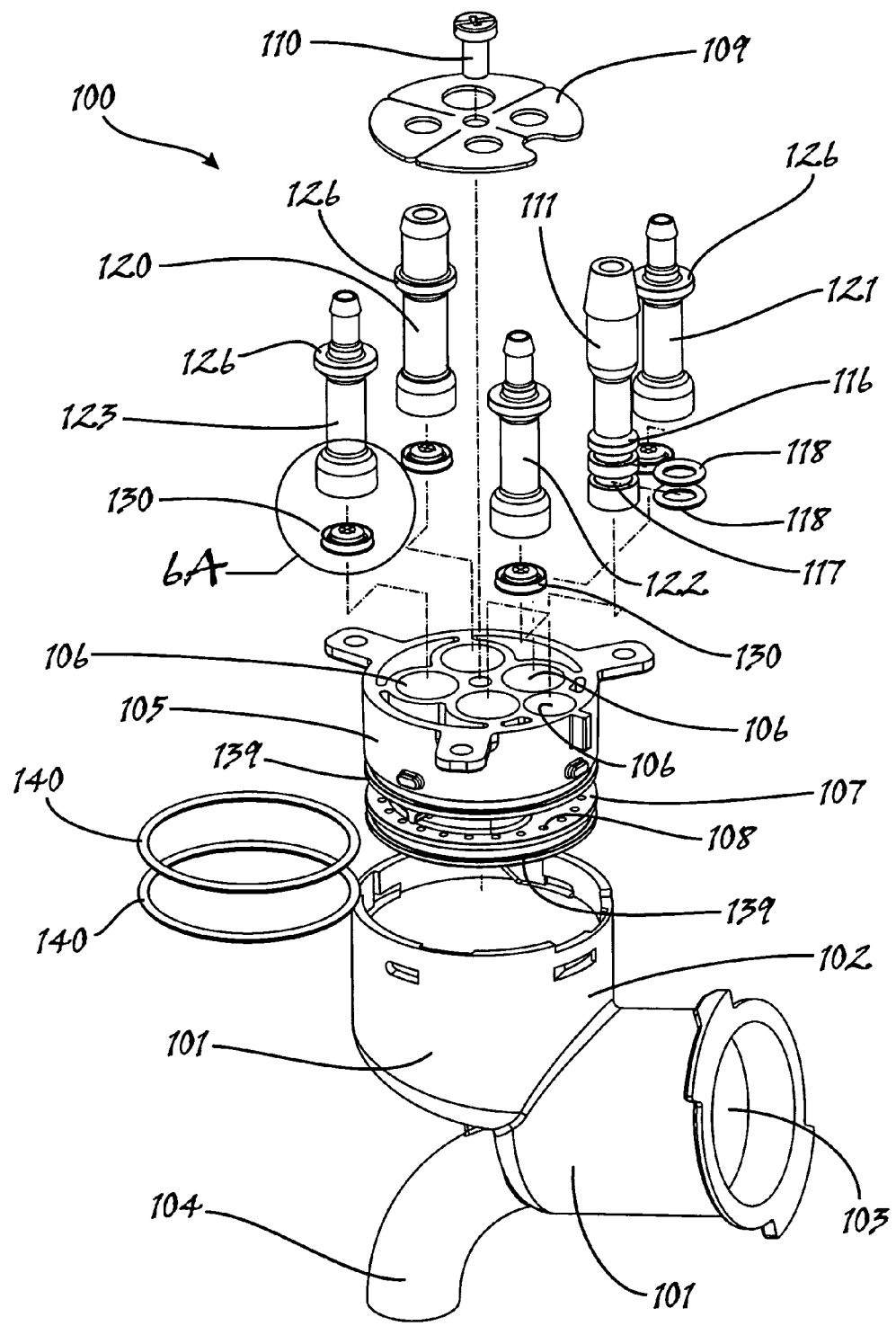
FIG. 6 is an exploded perspective view illustrating an alternative implementation of a multi-flavor nozzle according to the preferred embodiment.
Figure 7:
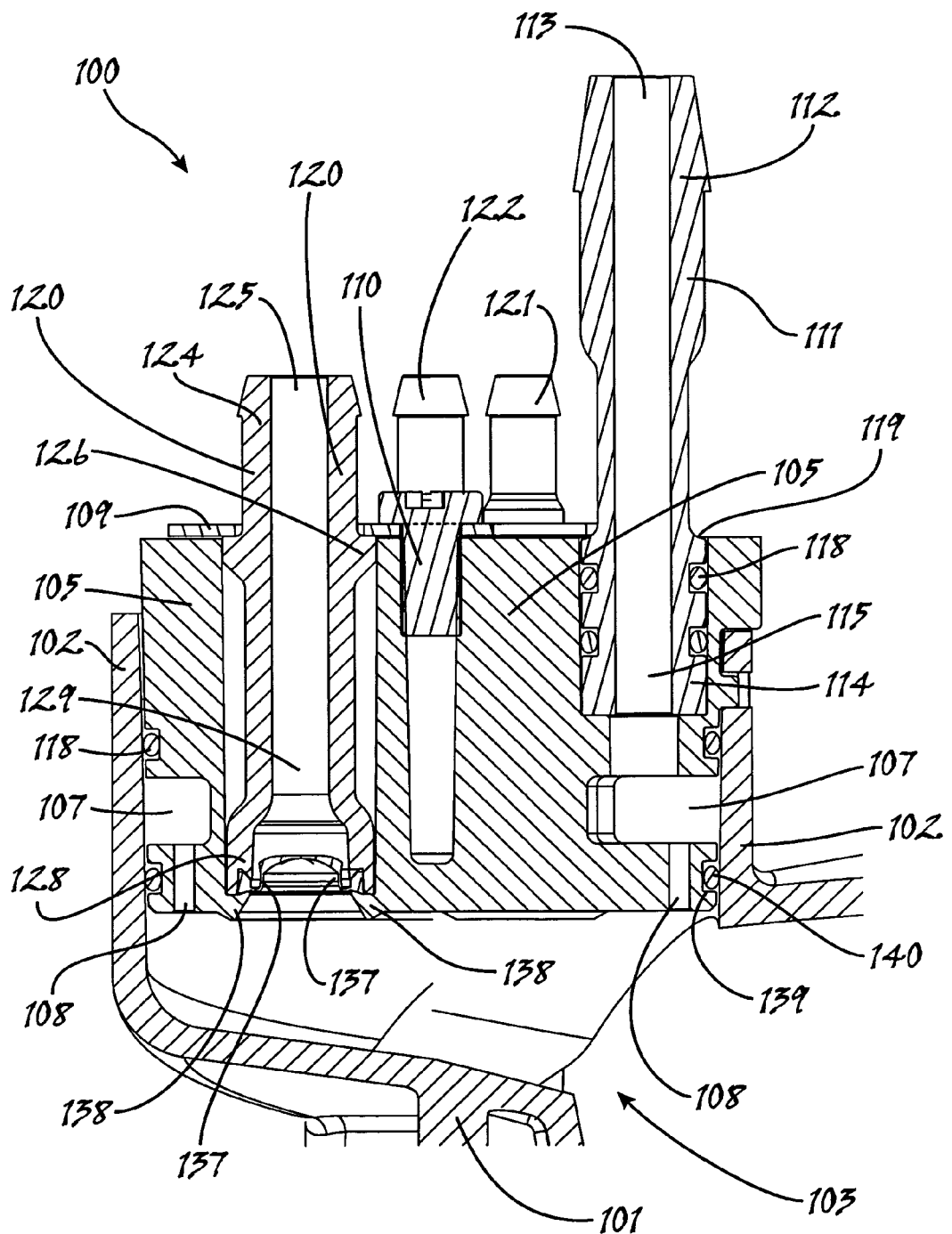
FIG. 7 is a perspective view in partial cross-section illustrating injectors for the alternative implementation of the multi-flavor nozzle of the beverage dispenser according to the preferred embodiment.
Figure 9:
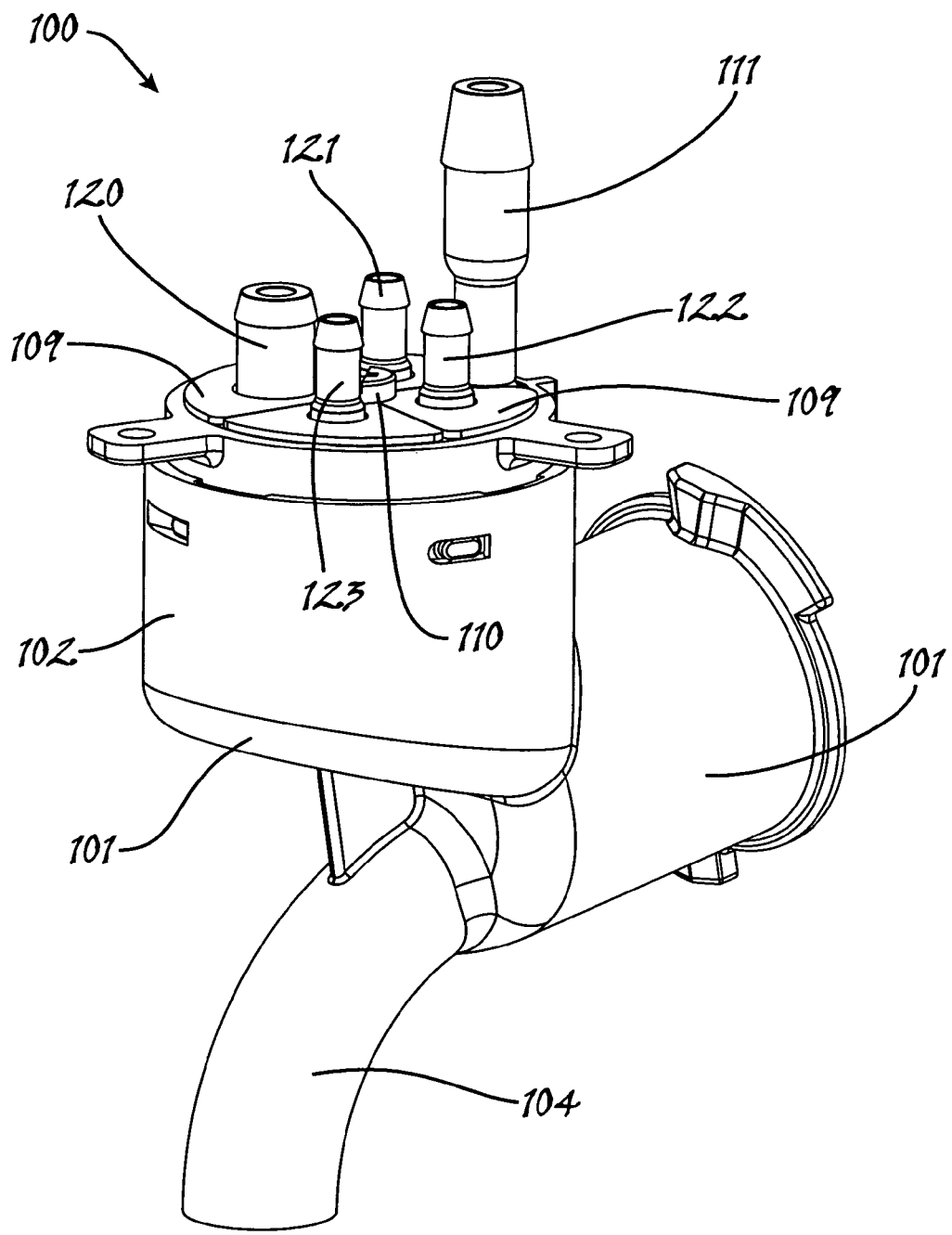
FIG. 9 is a perspective view illustrating the alternative implementation of a multi-flavor nozzle according to the preferred embodiment as assembled for use.

In a departure from the previously described implementation, however, and as will be better understood further herein, each concentrate injector 120-123 formed according to the presently described implemented is adapted to be sealingly fitted within one of the provided injector ports 106 without the necessity of O-rings or the like. In particular, as shown in FIGS. 6 and 7, each of the injectors 111, 120-123 of this implementation are formed or otherwise provided with a circumferentially shoulder 119, 126, respectively, such that the injectors 111, 120-123 may be, from their base ends 114, 127 secured in place within the injector body 105 by a provided injector retaining plate 109 or the like, which plate 109 may, as shown in the figures, be securely retained in place atop the injector body 105 by a provided plate retaining screw 110 or the like.

In any case, with the injectors 111, 120-123 in place within the injector body 105, fluid communication may be established between the various provided concentrate packages 22-25 and a respective concentrate injector 120-123 as well as between the source of mixing fluid and the diluent injector 111. In particular, mixing fluid communication is established by connecting the free end of the mixing fluid inlet line 21 to the first end 112 of the diluent injector 111 about its inlet port 113. Likewise fluid communication is established between the first concentrate package 22 and the first concentrate injector 120 by connecting the free end of the first concentrate inlet line 30 to the first end 124 of the first concentrate injector 120 about its inlet port 125; fluid communication is established between the second concentrate package 23 and the second concentrate injector 121 by connecting the free end of the second concentrate inlet line 31 to the first end 124 of the second concentrate injector 121 about its inlet port 125; fluid communication is established between the third concentrate package 24 and the third concentrate injector 122 by connecting the free end of the third concentrate inlet line 32 to the first end 124 of the third concentrate injector 122 about its inlet port 125; and fluid communication is established between the fourth concentrate package 25 and the fourth concentrate injector 123 by connecting the free end of the fourth concentrate inlet line 33 to the first end 124 of the fourth concentrate injector 123 about its inlet port 125.

Figure 6A:
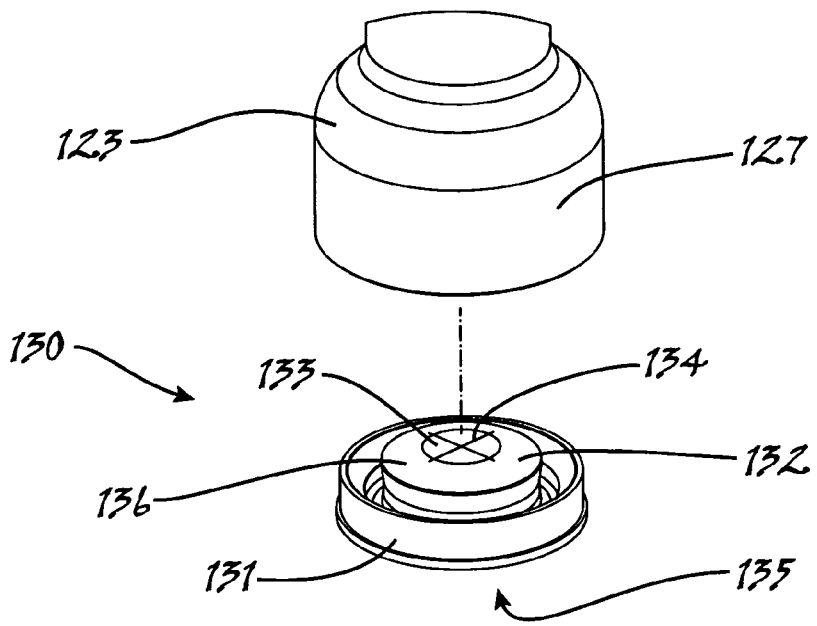
FIG. 6A is a perspective view in partially cutaway detail corresponding to detail 6A shown in FIG. 6 illustrating aspects of the injectors for the alternative implementation of the multi-flavor nozzle of the of the beverage dispenser according to the preferred embodiment.
Figure 8:
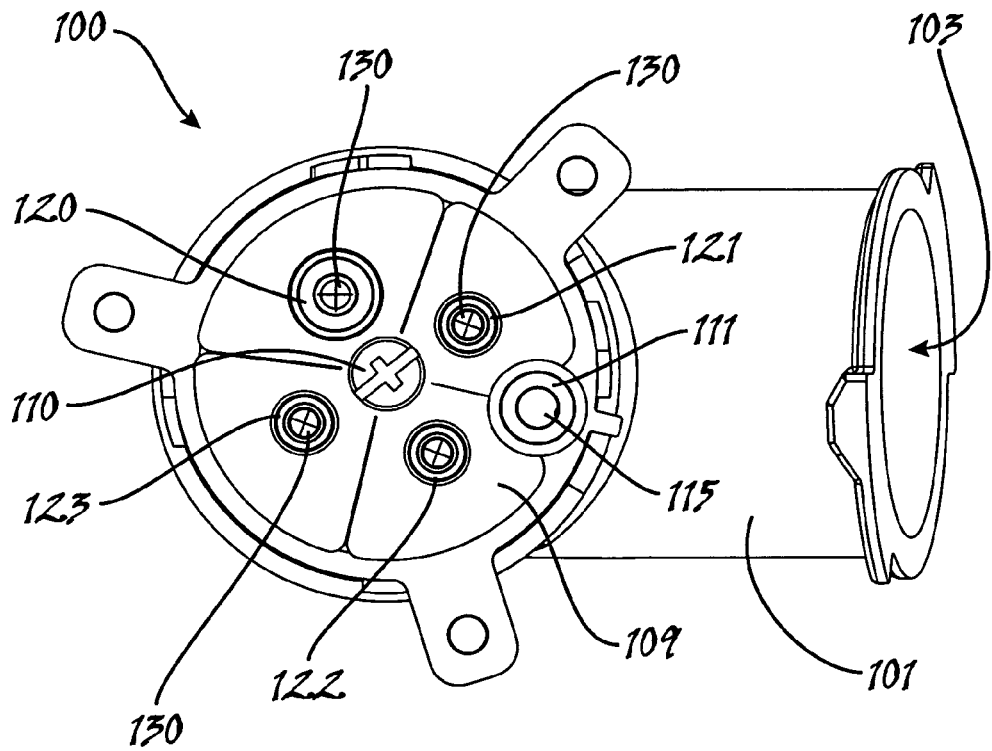
FIG. 8 is a top plan view illustrating the alternative implementation of a multi-flavor nozzle according to the preferred embodiment as assembled for use.

As also previously mentioned, a critical aspect of the present invention comprises the provision of a self-sealing dispensing valve 130 at the respective base end 64 of each concentrate injector 120-123, each self-sealing dispensing valve 130 being implemented substantially as described in Brown '143, which, by this reference, is incorporated herein as though now set forth in its entirety. In particular, as shown in FIGS. 6, 6A and 7 for the first and fourth ones of the concentrate injectors 120, 123 (each other injector 121, 122 being provided with substantially identical structure), the self-sealing dispensing valve includes a marginal flange 131, a valve head 132 with a discharge orifice 133 therein, and a connector sleeve 137 having one end connected with the valve flange 131 and the opposite end connected with the valve head 132 adjacent a marginal edge thereof. As described in Brown '143, the discharge orifice is formed with a plurality of slits 134 or the like and the interior surface 135 and exterior surface 136 are arcuately formed to cause the valve 130 to snap open under pressure from within the interior 129 of a concentrate injector 120-123 and to snap closed in the absence of such pressure. In order to secure the dispensing valve 130 in place at the base 127 of a concentrate injector 120-123, an annular groove 128 is formed about the base 127 of the concentrate injector 120-123 with size and shape generally corresponding to the marginal flange 131 of the valve 130 such that the concentrate injector 120-123 and valve 130 may be mated as shown in FIG. 6A. With the concentrate injector 120-123 and valve 130 so assembled, the concentrate injector 120-123 is placed from above within an injector port 106 whereafter the marginal flange 131 of the valve 130 will come to rest upon a ring-shaped valve retaining lip 138 formed at the lower portion of the injector port 106. As will be appreciated by those of ordinary skill in the art, placement of the previously described injector retaining plate 109 will then serve to clampingly hold the valve 130 in operable position in sealing engagement with the injector port 106.

In any case, as described in detail in Brown '143, the connector sleeve 137 has a resiliently flexible construction, such that when pressure within the interior space 129 of a concentrate injector 120-123 raises above a predetermined amount, the valve head 132 shifts outwardly in a manner which causes the connector sleeve 137 to double over and extend rollingly, causing the discharge orifice 133 to open to allow fluid flow from within the interior space 129 of the concentrate injector 120-123 to the mixing chamber 103. Additionally, however, the connector sleeve 137 is constructed to provide sufficient resiliency to automatically snap the valve head 132 back to the fully refracted position upon reduction of the pressure within the interior space 129 of the concentrate injector 120-123 to below the predetermined amount, no suck back or negative pressure from the concentrate injector 120-123 being required to effect closure of the valve 130.

Implemented as herein described, the multi-flavor nozzle system 100 of the present invention enables the mixing chamber 103 to be cleansed as often as between every dispense cycle because the provided self-sealing dispensing valves 130 prevent contamination and/or dilution by the cleansing fluid of the concentrate sources. In particular, the present invention contemplates running a cleaning cycle (which may simply comprise dispensing hot water from the diluent injector 111 through the mixing chamber 103 under the agitation of the whipper 45): (a) whenever manually instigated; (b) automatically upon the passage of a predetermined length of time or according to a set schedule; (c) prior to dispensing a selected beverage combination deemed incompatible flavor-wise with a previously dispensed beverage combination; (d) upon any combination of the foregoing events; or (e) upon the occurrence of any other predetermined triggering event.

In one example illustrative of the manner of use of the multi-flavor nozzle system 100 of the present invention (corresponding to the example previously described with respect to the first implementation of the multi-flavor nozzle system 20), the first concentrate package 22 is taken for illustrative purposes to contain milk, the second concentrate package 23 is taken for illustrative purposes to contain chocolate, the third concentrate package 24 is taken for illustrative purposes to contain vanilla flavoring and the fourth concentrate package 25 is taken for illustrative purposes to contain coffee while the mixing fluid is assumed for illustrative purposes to be water. Additionally, for illustrative purposes, it is assumed that the users of the beverage dispenser 10 incorporating the multi-flavor nozzle system 100 of the present invention demand the following beverages in the order set forth: coffee; coffee with milk; nothing for an extended period of time; coffee with milk; coffee with vanilla flavoring; and then hot chocolate.

To begin, then, the controller of the beverage dispenser 10 operates to dispense the first demanded coffee by first enabling flow of water at a normal flow rate, which in this case of course would be otherwise conventionally heated, through the mixing fluid inlet line 21 and into the inlet port 113 at the first end 112 of the diluent injector 111. As will be appreciated by those of ordinary skill in the art, especially in light of the foregoing discussion, the heated water will then flow freely through the open orifice 115 at the base end 114 of the diluent injector 111 and into and throughout the diluent manifold 107, whereafter the heated water will begin to spray through the provided diluent injector ports 108 into and substantially evenly distributed about the outer, lower portions of the mixing chamber 103.

As the heated water begins to be sprayed into the mixing chamber 103, the fourth pump 29 operates to force the coffee product from the fourth concentrate package 25 through the fourth concentrate line 33 into the inlet port 125 at the first end 124 of the fourth concentrate injector 123. As the pressure of the coffee product builds within the interior 129 of the fourth concentrate injector 123, the self-sealing dispensing valve 130 provided at the base end 127 of the fourth concentrate injector 123 is snapped open, as previously described, thereby enabling flow of the coffee product through the valve 130 and into the mixing chamber 103 where the coffee product joins the flowing heated water, which together flow into contact with the blades 46 of the whipper 45, which are operated under the control of the beverage dispenser controller by the whipper motor 47. The thoroughly mixed coffee beverage then flows freely through the nozzle outlet 104 into a cup or other beverage receptacle for enjoyment of a user.

As the quantity of coffee beverage produced reaches the quantity required for the particular cup or other beverage receptacle, the fourth pump 29 is deactivated by the beverage dispenser controller, thereby causing a decrease in the pressure of the coffee product within the interior 129 of the fourth concentrate injector 123. As soon as the pressure within the interior 129 of the fourth concentrate injector 123 decreases to below a threshold value, as previously described, the self-sealing dispensing valve 130 provided at the base end 127 of the fourth concentrate injector 123 is snapped closed, as also previously described. With the flow of coffee product into the mixing chamber 103 thus terminated, the flow of heated water through the mixing fluid inlet line 21 is also terminated under the otherwise ordinary control of the beverage dispenser controller, completing the desired dispensation of the coffee beverage.

Continuing with the example, it is noted that the next beverage assumed demanded is coffee with milk, which is further assumed to be demanded without significant delay following the previously demanded beverage. Because the currently demanded coffee with milk beverage contains each flavoring component present in the previously demanded coffee beverage, which did not contain any ingredients dictating special handling, and is demanded within a reasonable time following the prior dispensation, it may be assumed that the currently demanded beverage may be dispensed without need for running a cleaning cycle. As a result, the currently demanded coffee with milk beverage is dispensed as follows.

As with the previously dispensed coffee beverage, the controller of the beverage dispenser 10 first operates to enable flow of water at a normal flow rate, which in this case like the prior case would be otherwise conventionally heated, through the mixing fluid inlet line 21 and into the inlet port 113 at the first end 112 of the diluent injector 111. The heated water then flows freely through the open orifice 115 at the base end 114 of the diluent injector 111 and into and throughout the diluent manifold 107, whereafter the heated water sprays through the provided diluent injector ports 108 into and substantially evenly distributed about the outer, lower portions of the mixing chamber 103.

As the heated water begins to spray into the mixing chamber 103, the fourth pump 29 operates to force the coffee product from the fourth concentrate package 25 through the fourth concentrate line 33 into the inlet port 125 at the first end 124 of the fourth concentrate injector 123. As the pressure of the coffee product builds within the interior 129 of the fourth concentrate injector 123, the self-sealing dispensing valve 130 provided at the base end 127 of the fourth concentrate injector 123 is snapped open, as previously described, thereby enabling flow of the coffee product through the valve 130 and into the mixing chamber 103 where the coffee product joins the flowing heated water.

Substantially simultaneously with the introduction to the heated water of the coffee product, the first pump 26 operates to force the milk product from the first concentrate package 22 through the first concentrate line 30 into the inlet port 125 at the first end 124 of the first concentrate injector 120. As the pressure of the milk product builds within the interior 129 of the first concentrate injector 120, the self-sealing dispensing valve 130 provided at the base end 127 of the first concentrate injector 120 is snapped open, as previously described, thereby enabling flow of the milk product through the valve 130 and into the mixing chamber 103 where the milk product also joins the coffee product and flowing heated water, which all three together flow into contact with the blades 46 of the whipper 45, which are operated under the control of the beverage dispenser controller by the whipper motor 47. The thoroughly mixed coffee with milk beverage then flows freely through the nozzle outlet 104 into a cup or other beverage receptacle for enjoyment of a user.

As the quantity of coffee with milk beverage produced reaches the quantity required for the particular cup or other beverage receptacle, the first pump 26 and the fourth pump 29 are each deactivated by the beverage dispenser controller, thereby causing a decrease in the pressure of the milk product within the interior 129 of the first concentrate injector 120 as well as a decrease in the pressure of the coffee product within the interior 129 of the fourth concentrate injector 123. As soon as the pressure within the interior 129 of the first concentrate injector 120 decreases to below a threshold value, as previously described, the self-sealing dispensing valve 130 provided at the base end 127 of the first concentrate injector 120 is snapped closed, as also previously described. Likewise, as soon as the pressure within the interior 129 of the fourth concentrate injector 123 decreases to below a threshold value, the self-sealing dispensing valve 130 provided at the base end 127 of the fourth concentrate injector 123 is snapped closed. With both the flow of coffee product into the mixing chamber 103 and the flow of milk product into the mixing chamber 103 thus terminated, the flow of heated water through the mixing fluid inlet line 21 is also terminated under the otherwise ordinary control of the beverage dispenser controller, completing the desired dispensation of the coffee with milk beverage.

Continuing further with the previously established example, it is noted that the next demanded beverage is also coffee with milk, but that an extended period of time is assumed to have elapsed prior to demand of the beverage. As a result, at least one preferred implementation of the present invention contemplates that the controller for the beverage dispenser 10 will upon the passage of a predetermined time period instigate a cleaning cycle. Additionally, however, it is noted that the previously dispensed beverage contained milk, which is known to be generally more susceptible than other products to the growth of bacteria. As a result, the controller of the beverage dispenser may be implemented to shorten the threshold predetermined time period dictating instigation of a cleaning cycle when milk or a like product has been dispensed.

In any case, the cleaning cycle begins with the controller of the beverage dispenser 10 first operating to enable flow of water, conventionally heated to a very high temperature, through the mixing fluid inlet line 21 and into the inlet port 113 at the first end 112 of the diluent injector 111. The heated water then flows through the open orifice 115 at the base end 114 of the diluent injector 111 and into and throughout the diluent manifold 107, whereafter the heated water sprays through the provided diluent injector ports 108 into and all about mixing chamber 103. Although not set forth in the above example, it should be noted that a concentrate type injector may, if desired, be provided for the purpose of introducing a cleaning fluid into the flow of heated water in similar manner as previously described with respect to introduction to a product of a concentrate product.

In any case, the cleaning water or solution, which may if desired be further distributed utilizing the whipper 45, is drained through the nozzle outlet 104 and into the tray 13 where it is in turn handled in the conventional manner of a spill into the tray 13. Critically, however, it is noted no cleaning water or solution enters into any of the concentrate injectors 120-123, each of which are isolated from the mixing chamber 103 with a respectively provided self-sealing dispensing valve 130. Finally, once the mixing chamber 103 is deemed "clean" the flow of heated water through the mixing fluid inlet line 21 is terminated under the otherwise ordinary control of the beverage dispenser controller, completing the desired cleaning cycle. The nozzle system 100 of the beverage dispenser 10 thus being cleaned and ready for any further use, the desired coffee with milk beverage is dispensed when demanded as generally previously described.

As the example continues, the next desired beverage is coffee with vanilla flavoring. In this case, it is first noted that coffee with vanilla flavoring may, from a flavor perspective, be considered compatible with a previous dispensation of coffee with milk, the coffee and vanilla combination being generally overpowering in flavor to any remnant of milk as may exist within the mixing chamber 103 as a result of the previous dispensation. If desired for any reason however, be it safety or other special handling concern or otherwise, the present invention may be implemented such that a cleaning cycle is instigated prior to any dispensation of a product combination not containing any component that follows any previous dispensation that does contain the omitted component. In such a case, the user is instructed to delay placing his or her cup in order that the cleaning cycle may operate, as previously described, after which the user is instructed to place his or her cup for receiving the desired beverage. As will be appreciated by those of ordinary skill in the art, the controller for the beverage dispenser 10 may if desired be programmed to require user acknowledgement of such instructions, which of course may take place through the user inputs 19 provided on the front panel 14 of the beverage dispenser 10. In any case, following the implemented cleaning cycle, the beverage dispenser 10 operates to dispense the coffee with vanilla beverage.

To dispense the coffee with vanilla beverage, the controller of the beverage dispenser 10 first operates to enable flow of water at a normal flow rate, which in this case like the prior case would be otherwise conventionally heated, through the mixing fluid inlet line 21 and into the inlet port 113 at the first end 112 of the diluent injector 111. The heated water then flows freely through the open orifice 115 at the base end 114 of the diluent injector 111 and into and throughout the diluent manifold 107, whereafter the heated water sprays through the provided diluent injector ports 108 into and substantially evenly distributed about the outer, lower portions of the mixing chamber 103.

As the heated water begins to spray into the mixing chamber 103, the fourth pump 29 operates to force the coffee product from the fourth concentrate package 25 through the fourth concentrate line 33 into the inlet port 125 at the first end 124 of the fourth concentrate injector 123. As the pressure of the coffee product builds within the interior 129 of the fourth concentrate injector 123, the self-sealing dispensing valve 130 provided at the base end 127 of the fourth concentrate injector 123 is snapped open, as previously described, thereby enabling flow of the coffee product through the valve 130 and into the mixing chamber 130 where the coffee product joins the flowing heated water.

Substantially simultaneously with the introduction to the heated water of the coffee product, the third pump 28 operates to force the vanilla product from the third concentrate package 24 through the third concentrate line 32 into the inlet port 125 at the first end 124 of the third concentrate injector 122. As the pressure of the vanilla product builds within the interior 129 of the third concentrate injector 122, the self-sealing dispensing valve 130 provided at the base end 127 of the third concentrate injector 122 is snapped open, as previously described, thereby enabling flow of the vanilla product through the valve 130 and into the mixing chamber 103 where the vanilla product also joins the coffee product and flowing heated water, which all three together flow into contact with the blades 46 of the whipper 45, which are operated under the control of the beverage dispenser controller by the whipper motor 47. The thoroughly mixed coffee with vanilla beverage then flows freely through the nozzle outlet 104 into the cup or other beverage receptacle as placed by the user in accordance with the previously described instruction.

As the quantity of coffee with vanilla beverage produced reaches the quantity required for the particular cup or other beverage receptacle, the third pump 28 and the fourth pump 29 are each deactivated by the beverage dispenser controller, thereby causing a decrease in the pressure of the vanilla product within the interior 129 of the third concentrate injector 122 as well as a decrease in the pressure of the coffee product within the interior 129 of the fourth concentrate injector 123. As soon as the pressure within the interior 129 of the third concentrate injector 122 decreases to below a threshold value, as previously described, the self-sealing dispensing valve 130 provided at the base end 127 of the third concentrate injector 122 is snapped closed, as also previously described. Likewise, as soon as the pressure within the interior 129 of the fourth concentrate injector 123 decreases to below a threshold value, the self-sealing dispensing valve 130 provided at the base end 127 of the fourth concentrate injector 123 is snapped closed. With both the flow of coffee product into the mixing chamber 103 and the flow of vanilla product into the mixing chamber 103 thus terminated, the flow of heated water through the mixing fluid inlet line 21 is also terminated under the otherwise ordinary control of the beverage dispenser controller, completing the desired dispensation of the coffee with vanilla beverage.

Finally, the previously established example calls for dispensing a hot chocolate beverage immediately following the dispensation of the coffee with vanilla beverage. For this example, it is assumed that the previously utilized vanilla product comprised a flavoring not requiring the special handling as previously described in application to the milk product. In this case, however, it may be determined that the powerful flavoring of the coffee with vanilla beverage is not compatible with the more subtle flavoring of the now desired hot chocolate beverage. As a consequence, the controller of the beverage dispenser 10 is therefore preferably programmed to instigate a cleaning cycle prior to dispensing the demanded hot chocolate beverage.

As in the previously described case of a cleaning cycle being instigated as a matter of special handing, in this case the user is also instructed to delay placing his or her cup in order that the cleaning cycle may operate, as previously described, after which the user is instructed to place his or her cup for receiving the desired beverage. Following the implemented cleaning cycle, the beverage dispenser 10 then operates to dispense the hot chocolate beverage. To dispense the hot chocolate beverage, the controller of the beverage dispenser 10 first operates to enable flow of water at a normal flow rate, which in this case like the prior cases would be otherwise conventionally heated, through the mixing fluid inlet line 21 and into the inlet port 113 at the first end 112 of the diluent injector 111. The heated water then flows freely through the open orifice 115 at the base end 114 of the diluent injector 111 and into and throughout the diluent manifold 107, whereafter the heated water sprays through the provided diluent injector ports 108 into and substantially evenly distributed about the outer, lower portions of the mixing chamber 103.

As the heated water begins to spray into the mixing chamber 103, the second pump 27 operates to force the chocolate product from the second concentrate package 23 through the second concentrate line 31 into the inlet port 125 at the first end 124 of the second concentrate injector 121. As the pressure of the chocolate product builds within the interior 129 of the second concentrate injector 121, the self-sealing dispensing valve 130 provided at the base end 127 of the second concentrate injector 121 is snapped open, as previously described, thereby enabling flow of the chocolate product through the valve 130 and into the mixing chamber 103 where the chocolate product joins the flowing heated water, which together flow into contact with the blades 46 of the whipper 45, which are operated under the control of the beverage dispenser controller by the whipper motor 47. The thoroughly mixed hot chocolate beverage then flows freely through the nozzle outlet 104 into the cup or other beverage receptacle as placed by the user in accordance with the previously described instruction.

As the quantity of hot chocolate beverage produced reaches the quantity required for the particular cup or other beverage receptacle, the second pump 27 is deactivated by the beverage dispenser controller, thereby causing a decrease in the pressure of the chocolate product within the interior 129 of the second concentrate injector 121. As soon as the pressure within the interior 129 of the second concentrate injector 121 decreases to below a threshold value, as previously described, the self-sealing dispensing valve 130 provided at the base end 127 of the second concentrate injector 121 is snapped closed, as also previously described. With the flow of chocolate product into the mixing chamber 103 thus terminated, the flow of heated water through the mixing fluid inlet line 21 is also terminated under the otherwise ordinary control of the beverage dispenser controller, completing the desired dispensation of the hot chocolate beverage and concluding this example.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. For example, those of ordinary skill in the art will recognize that with the ability to readily cleanse remnant flavorings and the like from within the multi-flavor nozzle assembly 20, 100 of the present invention before any dispense cycle, the present invention is particularly adapted to allow for dispensing of water, whether heated or cold and with or without the addition thereto of a flavoring. In any case, the scope of the present invention is not to be limited in any respect by the foregoing description; rather, it is defined only by the claims that follow.

What is claimed is:

1. A nozzle system for use with a multi-flavor beverage dispenser, said nozzle system comprising:
    a nozzle body defining an injector housing, a mixing chamber, and an outlet from said mixing chamber;
    an injector body disposed within said injector housing, said injector body defining:
        a diluent manifold formed circumferentially about an outer and a lower portion of said injector body, said diluent manifold communicating with said mixing chamber,
        a first concentrate injector port formed through said injector body interior of said diluent manifold such that said first concentrate injector port communicates with said mixing chamber without intersecting said diluent manifold,
        a second concentrate injector port formed through said injector body interior of said diluent manifold such that said second concentrate injector port communicates with said mixing chamber without intersecting said diluent manifold, and
        a diluent injector port formed in an outer portion of said injector body exterior of said first and second concentrate injector ports such that said diluent injector port resides over and communicates directly into said diluent manifold;
    a first concentrate injector disposed within said first concentrate injector port, said first concentrate injector coupled with a first concentrate source for delivering concentrate to said mixing chamber;
    a second concentrate injector disposed within said second concentrate injector port, said second concentrate injector coupled with a second concentrate source for delivering concentrate to said mixing chamber; and
    a diluent injector disposed within said diluent injector port, said diluent injector coupled with a diluent source for delivering diluent to said diluent manifold, wherein said diluent manifold delivers said diluent circumferentially into said mixing chamber.

* * * * *